(12) United States Patent
Sakaida et al.

(10) Patent No.: US 7,189,176 B2
(45) Date of Patent: Mar. 13, 2007

(54) MOTOR-DRIVEN STEERING APPARATUS

(75) Inventors: Shinichi Sakaida, Tochigi (JP); Hiroshi Fujita, Tochigi (JP); Katsutomo Takakura, Tochigi (JP)

(73) Assignee: Showa Corporation, Gyoda (JP)

( * ) Notice: Subject to any disclaimer, the term of this patent is extended or adjusted under 35 U.S.C. 154(b) by 0 days.

(21) Appl. No.: 11/222,459

(22) Filed: Sep. 8, 2005

(65) Prior Publication Data

US 2006/0183583 A1 Aug. 17, 2006

(30) Foreign Application Priority Data

Feb. 16, 2005 (JP) .............................. 2005-039017

(51) Int. Cl.
*F16D 7/00* (2006.01)
*F16D 11/00* (2006.01)
*F16D 41/00* (2006.01)
*F16H 27/10* (2006.01)

(52) U.S. Cl. .................... 474/148; 74/89.23; 74/89.22; 74/89.2

(58) Field of Classification Search ................ 474/148; 74/84 R, 25, 37, 424.71, 424.81, 424.89, 74/424, 89.22, 89.23, 89.2, 388 PS; 180/444
See application file for complete search history.

(56) References Cited

U.S. PATENT DOCUMENTS 5,244,435 A * 9/1993 Billett ........................ 474/184
5,853,058 A * 12/1998 Endo et al. .................. 180/65.1
6,594,460 B1 * 7/2003 Williams et al. ............ 399/165
6,749,040 B1 * 6/2004 Menjak et al. .............. 180/443
6,938,722 B2   9/2005 Sasaki et al.

FOREIGN PATENT DOCUMENTS

| EP | 1 553 006 A1 | 7/2005 |
| JP | 11-11625 * | 1/1999 |
| JP | 2003-291830 | 10/2003 |
| JP | 2003-343700 | 12/2003 |
| WO | WO-2004/018279 | 3/2004 |

OTHER PUBLICATIONS

European Search Report issued in European Application No. EP 05 02 0353 mailed on Sep. 11, 2006, 7 pages.

* cited by examiner

*Primary Examiner*—Richard Ridley
*Assistant Examiner*—Terence Boes
(74) *Attorney, Agent, or Firm*—Osha·Liang LLP

(57) ABSTRACT

A motor-driven steering apparatus includes a steering member reciprocating in correspondence to a steering wheel operation, a ball nut inserted to a ball thread shaft of the steering member, a drive pulley driven by an electric motor, and a driven pulley coupled to the drive pulley via a belt and integrally rotating with the ball nut. The drive pulley is provided with a pulley main body which is rotatably supported in both sides in an axial direction by a pair of rolling bearings, and is provided with a plurality of tooth portions, and a pair of regulating members attached to both end sides in an axial direction thereof. The respective regulating members is pinched between an inner ring of the rolling bearing and an end portion of the pulley main body.

7 Claims, 3 Drawing Sheets

MOTOR-DRIVEN STEERING APPARATUS

BACKGROUND OF THE INVENTION

1. Field of the Invention

The present invention relates to a motor-driven steering apparatus applying an assist torque obtained by an electric motor to a steering torque from a steering wheel.

2. Description of the Related Art

Conventionally, as a motor-driven steering apparatus applying an assist torque obtained by an electric motor to a steering torque from a steering wheel, there has been known a structure provided with a steering member reciprocating in a longitudinal direction in correspondence to a rotation of a steering wheel, a ball nut outside inserted to a ball thread shaft formed in the steering member via a plurality of balls, a drive pulley provided in a drive shaft of an electric motor, and a driven pulley coupled to the drive pulley via a belt and integrally rotating with the ball nut (for example, Japanese Patent Application Laid-open No. 2003-291830 (refer to patent document 1)). In accordance with this structure, since the belt is interposed in a power transmission path between the electric motor and the steering member, a vibration or the like from the steering member is not transmitted to the electric motor, and it is possible to maintain a rotational accuracy of the electric motor.

In this kind of motor-driven steering apparatus, a toothed pulley is employed for both pulleys comprising the drive pulley and the driven pulley, and the belt wound around both the pulleys is constituted by a toothed belt, thereby preventing a slip between both the pulleys and the belt.

The toothed pulley employed as the drive pulley is structured such that a plurality of tooth portions are formed with a predetermined interval in a peripheral direction, and the tooth portions are engaged with the belt teeth formed in the belt, thereby efficiently transmitting a rotating force of the drive pulley to the belt. Further, since the belt is moved in an axial direction of the drive pulley at a time of a rotation of the drive pulley, a pair of regulating portions regulating the movement of the belt from both sides in a width direction of the belt are integrally formed in the drive pulley so as to protrude in a collar shape in an outer peripheral direction from both sides in the axial direction of the drive pulley.

However, in this kind of toothed pulley, since it is necessary to form the tooth portions between both the regulating portions, the regulating portions form an obstacle at a time of forming the tooth portions, and there is a disadvantage that it is hard to process the tooth portions.

Accordingly, there has been known a toothed pulley structured by attaching a pair of regulating members operating as the regulating portion to both ends of the pulley main body in which the tooth portions are formed (for example, Japanese Patent Application Laid-open No. 2003-343700 (refer to patent document 2)). Accordingly, the regulating portion does not form an obstacle at a time of forming the tooth portions because each of the regulating members is attached after previously forming the tooth portions in the pulley main body. Thus, it is possible to more easily manufacture.

However, in the case that the drive pulley is structured by the pulley main body and the respective regulating members, there is a risk that the pulley main body and each of the regulating members are carelessly detached during the rotation. Accordingly, it is necessary that a coupling means for firmly coupling the pulley main body and each of the regulating members is provided, and there is a disadvantage that the drive pulley becomes larger in size.

Further, in the case that a taper-shaped inclined surface brought into contact with an end edge of the belt at a time when the belt moves in a width direction is formed in each of the regulating members, it is necessary to correctly attach each of the regulating members to the pulley main body in such a direction that the inclined surface is positioned at the pulley main body side. Accordingly, reassembly work or the like is required in the case where each of the regulating members is attached to the pulley main body in an erroneous direction, and there is a disadvantage that assembly work efficiency is significantly lowered.

SUMMARY OF THE INVENTION

One or more embodiments of the present invention provide a motor-driven steering apparatus provided with a compact drive pulley in which not only the drive pulley is structured by a pulley main body and each of regulating members so as to easily process a tooth portion in the drive pulley, but also it is possible to prevent each of the regulating members from being erroneously attached to the pulley main body, whereby an attaching state between the pulley main body and each of the regulating members is firm.

In accordance with one or more embodiments of the present invention, there is provided a motor-driven steering apparatus applying an assist torque by an electronic motor to a steering torque from a steering wheel comprising: a rod-like steering member reciprocating in a longitudinal direction in correspondence to a rotation of a steering wheel; a ball nut inserted to a ball thread shaft formed in the steering member via a plurality of balls; a drive pulley provided in a drive shaft of the electric motor; a driven pulley coupled to the drive pulley via a belt and integrally rotating with the ball nut; and the drive pulley being rotatably supported in both sides in an axial direction by a rolling bearing. The drive pulley comprises a pulley main body provided with a plurality of tooth portions with a predetermined interval in a peripheral direction, and a pair of regulating members attached to both end sides in an axial direction of the pulley main body and regulating a movement in a width direction of a belt wound around the pulley main body, and each of the regulating members is pinched between an inner ring of the rolling bearing and an end portion of the pulley main body.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
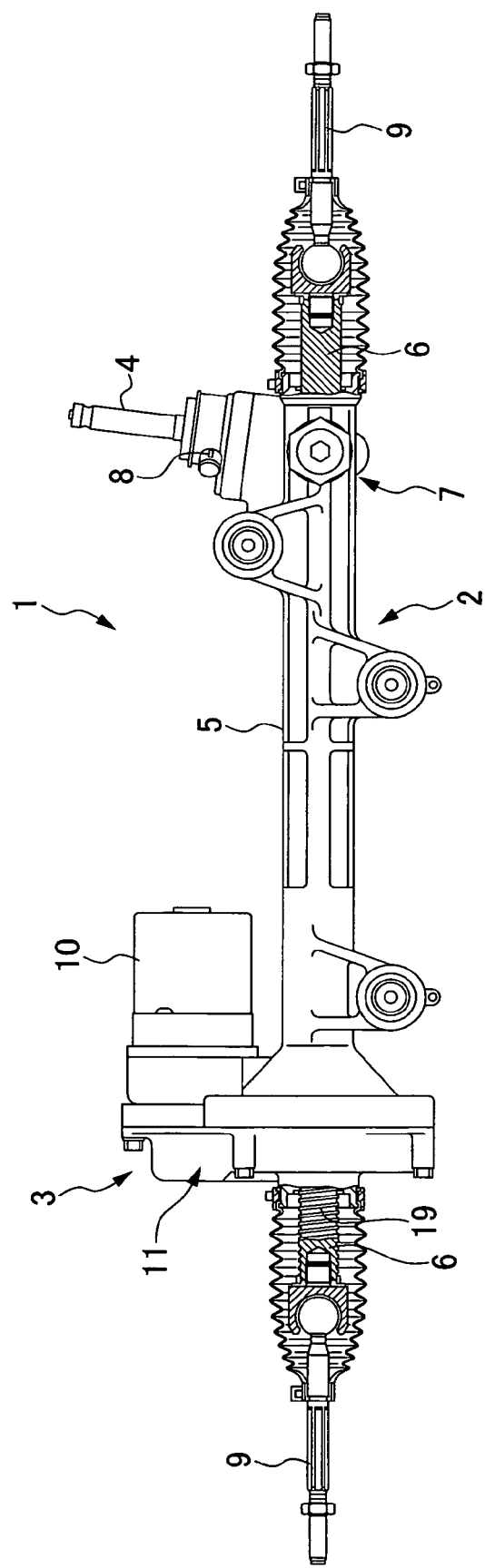
FIG. 1 is a view showing a motor-driven steering apparatus in accordance with an embodiment of the present invention.

As shown in FIG. 1, a motor-driven steering apparatus 1 in accordance with an embodiment of the present invention is provided with a steering mechanism 2, and an assist torque mechanism 3 applying an assist torque to the steering mechanism 2. The steering mechanism 2 is structured such as to reciprocate a steering member 6 within a housing 5 in a longitudinal direction by inputting a rotation of a steering wheel (not shown) of a vehicle to an input shaft 4. In other words, the rotation of the steering wheel input to the input shaft 4 is converted into a reciprocation of the steering member 6 by a converting mechanism 7 such as a rack and pinion mechanism or the like. A torque sensor 8 is provided in the converting mechanism 7. The torque sensor 8 detects a steering torque input to the input shaft 4.

Tie rods 9 are coupled to both end portions of the steering member 6. Each of the tie rods 9 is coupled to a tire wheel (not shown) which can be steered in a vehicle. Further, a steering motion is applied to the tire wheel on the basis of a linear movement in a longitudinal direction of the steering member 6.

The assist torque mechanism 3 is provided with an electric motor 10 arranged along an outer side surface of the housing 5 in which the steering member 6 is received, and a torque transmission mechanism 11 transmitting an assist torque generated by the electric motor 10 to the steering member 6. The electric motor 10 is controlled by a control means (not shown) to which a detected signal of the torque sensor 8 is input, and generates the assist torque in correspondence to the steering torque detected by the torque sensor 8.

Figure 2:
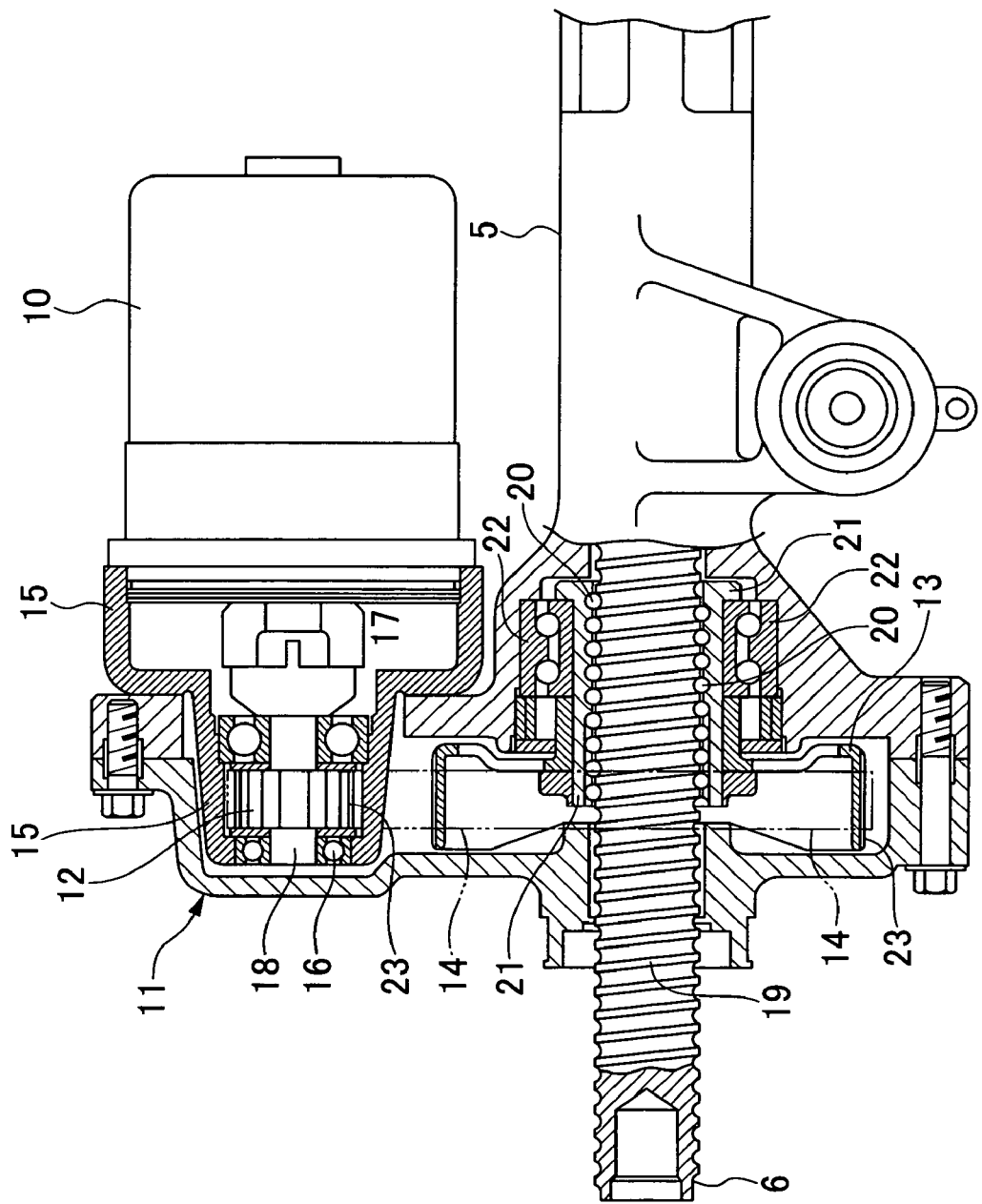
FIG. 2 is a cross sectional view of a main portion of the present embodiment.

The torque transmitting mechanism 11 is constituted by a drive pulley 12 coupled to the electric motor 10, a driven pulley 13 coupled to the steering member 6, and a belt 14 wound around both the pulleys 12 and 13, as shown in FIG. 2. The drive pulley 12 is rotatably supported between a pair of ball bearings 16 and 17 (roller bearings) fitted and held to an inner portion of a support case 15 of the electric motor 10 via a rotary shaft 18. The rotary shaft 18 of the drive pulley 12 is coupled to an output shaft of the electric motor 10, and is driven by the electric motor 10. The rotation of the drive pulley 12 is transmitted to the driven pulley 13 via the belt 14, and the rotation of the driven pulley 13 is applied as an assist force to the reciprocation of the steering member 6.

In other words, a ball thread shaft 19 is formed near the electric motor 10 in the steering member 6, and a ball nut 21 is coupled to the ball thread shaft 19 via a plurality of balls 20. The ball nut 21 is attached to the housing 5 of the steering member 6 by an angular contact ball bearing 22 so as to be rotatable and immovable in an axial direction. The driven pulley 13 is fastened and fixed to the ball nut 21, and is integrally rotated with the ball nut 21.

Further, the driven pulley 12 and the driven pulley 13 are constituted by a so-called toothed pulley, and a plurality of tooth portions 23 are formed at a predetermined interval in a peripheral direction thereof. The structure is made such that the rotating force of the drive pulley 12 is efficiently transmitted to the belt 14 by engaging the tooth portions 23 with the belt teeth formed in the belt 14.

Figure 3:
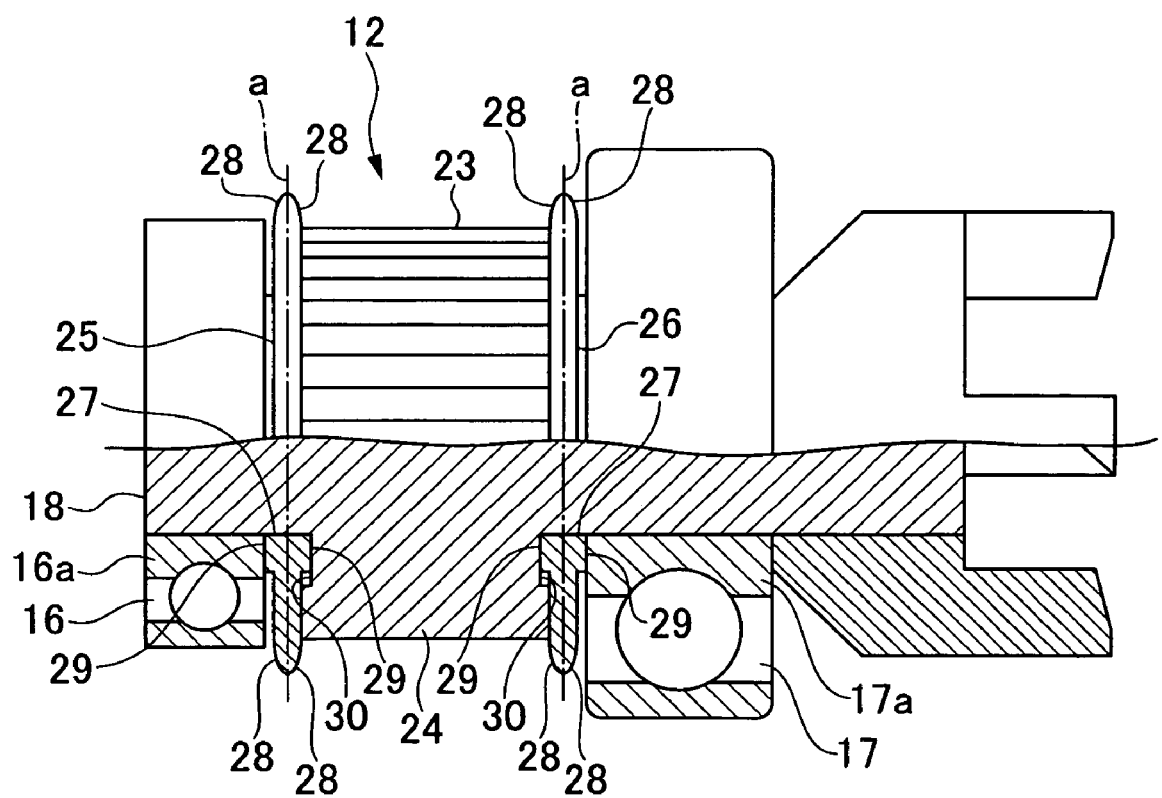
FIG. 3 is a cross sectional view of a drive pulley and a portion near the same in the present embodiment.

Next, a description of further details of the drive pulley 12 is presented. As shown in FIG. 3, the rotary shaft 18 of the drive pulley 12 is inserted and supported to inner rings 16*a* and 17*a* of a pair of ball bearings 16 and 17. A pulley main body 24 positioned between both the ball bearings 16 and 17 is integrally formed in the rotary shaft 18. A plurality of tooth portions 23 are formed in an outer periphery of the pulley main body 24 at a predetermined interval. Further, a pair of regulating members 25 and 26 are provided in both sides in an axial direction of the pulley main body 24. Each of the regulating members 25 and 26 is formed approximately in a disc shape having an axial hole 27, and the rotary shaft 18 is pressure inserted to the axial hole 27, thereby being supported to the rotary shaft 18 integrally with the pulley main body 24. As mentioned above, since the drive pulley 12 is constituted by the pulley main body 24 and a pair of regulating members 25 and 26, it is possible to process the tooth portions 23 in the pulley main body 24 before attaching the regulating members 25 and 26, and it is possible to easily execute the processing work of the tooth portion 23.

Further, an inclined surface 28 is formed along an outer peripheral edge in each of the regulating members 25 and 26, and a convex portion 29 protruding cylindrically in an axial direction is formed near a peripheral edge portion of the axial hole 27. Further, in each of the regulating members 25 and 26, one half shape in a side facing to the pulley main body 24 and the other half shape in a side facing to the ball bearings 16 and 17 are formed in the same shape. In other words, each of the regulating members 25 and 26 is formed in a symmetrical shape with respect to a center surface of the regulating members 25 and 26 orthogonal to the rotary shaft 18 shown by a single-dot chain line a in FIG. 3. Further, both the regulating members 25 and 26 are formed in the same shape. As mentioned above, since the side half shapes are formed in the same shape with regard to each of the regulating members 25 and 26, each of the regulating members 25 and 26 may be attached to the pulley main body 24 in any direction. Accordingly, an erroneous assembly of each of the regulating members 25 and 26 is not generated with respect to the pulley main body 24, and an assembling work is easily executed.

The inclined surface 28 of each of the regulating members 25 and 26 protrudes in a collar shape in an outer peripheral direction of the pulley main body 24, and guides the belt 14 in a width direction so as to prevent the belt 14 from coming off from the pulley main body 24 at a time when the belt 14 moves in an axial direction of the pulley main body 24.

Further, a convex portion 29 in one of the regulating members 25 and 26 is brought into contact with the inner rings 16*a* and 17*a* of the ball bearings 16 and 17, whereby each of the regulating members 25 and 26 is fixed in a pinched state between the ball bearings 16 and 17 and the pulley main body 24 without preventing the rotary shaft 18 from being rotated. Further, the convex portion 29 of the other of the regulating members 25 and 26 is received in a receiving portion 30 formed at a corresponding position of the pulley main body 24, whereby each of the regulating members 25 and 26 is attached in a sealed state to the pulley main body 24.

Next, a description will be given of an operation of an embodiment of the present invention. When the vehicle is in a straight going state and the steering force of the steering wheel is not input to the input shaft 4, the torque sensor 8 does not generate any output signal, and the electric motor 10 coupled to the shaft of the drive pulley 12 does not generate any assist torque. Further, as this time, the steering member 6 does not move, and any steering force is not generated in the tire wheel (not shown).

On the other hand, when the vehicle is going to go around a curve, the driver turns and steers the steering wheel. At this time, the steering force applied to the input shaft 4 is transmitted to the steering member 6 via the converting mechanism 7, and is transmitted to the tire wheel via the tie rod 9. At the same time, the torque corresponding to the steering force applied to the input shaft 4 is detected by the torque sensor 8, and the rotation of the electric motor 10 driven on the basis of the detected signal is applied as the assist force to the steering member 6 via the drive pulley 12, the driven pulley 13, the ball nut 21 and the ball thread shaft 19.

One or more embodiments of the present may include one or more of the following advantages. The transmission of the assist torque is efficiently executed by employing the toothed pulley for the drive pulley 12 and the driven pulley 13, however, as mentioned above, since the drive pulley 12 is constituted by the pulley main body 24 and a pair of regulating members 25 and 26, a workability of the tooth portion 23 (refer to FIG. 3) with respect to the drive pulley 12 is good. Further, since both side half portions of each of the regulating members 25 and 26 are identical to each other, it is possible to prevent each of the regulating members 25 and 26 from being erroneously attached to the pulley main body 24. Further, since each of the regulating members 25 and 26 is pinched between the pulley main body 24 and the ball bearings 16 and 17, each of the regulating members 25 and 26 is not carelessly detached, so that it is possible to securely maintain an attaching state. Further, since it is possible to form compactly without using the other members for coupling, to attach each of the regulating members 25 and 26 to the pulley main body 24, it is possible to easily arrange even in a small space in an inner portion of the support case 15 (refer to FIG. 2) of the electric motor 10.

As mentioned above, in accordance with one or more embodiments of the present invention, there is provided a motor-driven steering apparatus applying an assist torque by an electronic motor to a steering torque from a steering wheel comprising: a rod-like steering member reciprocating in a longitudinal direction in correspondence to a rotation of a steering wheel; a ball nut outside inserted to a ball thread shaft formed in the steering member via a plurality of balls; a drive pulley provided in a drive shaft of the electric motor; a driven pulley coupled to the drive pulley via a belt and integrally rotating with the ball nut; and the drive pulley being rotatably supported in both sides in an axial direction by a rolling bearing. The drive pulley comprises a pulley main body provided with a plurality of tooth portions with a predetermined interval in a peripheral direction, and a pair of regulating members attached to both end sides in an axial direction of the pulley main body and regulating a movement in a width direction of a belt wound around the pulley main body, and each of the regulating members is pinched between an inner ring of the rolling bearing and an end portion of the pulley main body.

In accordance with one or more embodiments of the present invention, since the drive pulley is structured by attaching each of the regulating members which are independent from the pulley main body to the pulley main body, it is possible to easily process the tooth portions by attaching each of the regulating members after previously forming the tooth portions in the pulley main body. Further, even if the drive pulley is constituted by the pulley main body and each of the regulating members, since each of the regulating members is pinched between the inner ring of the rolling bearing and the end portion of the pulley main body, it is possible to prevent each of the regulating members from being carelessly detached from the pulley main body. Further, since the attaching state of each of the regulating members to the pulley main body can be maintained by being pinched by the inner ring of the rolling bearing and the end portion of the pulley main body, the coupling means for firmly coupling the pulley main body and each of the regulating members is not required, so that it is possible to compactly structure the drive pulley.

Further, in the motor-driven steering apparatus in accordance with one or more embodiments of the present invention, each of the regulating members of the drive pulley is formed such that one side half portion facing to the pulley main body and the other side half portion facing to the rolling bearing have the same shape.

In accordance with the present invention, since the half portion shape in the pulley main body side of each of the regulating members and the half portion shape in the rolling bearing side have the same shape, each of the regulating members may be attached to the portion between the pulley main body and the rolling bearing in any direction, and an erroneous assembly is not generated.

Further, in the motor-driven steering apparatus in accordance with one or more embodiments of the present invention, each of the regulating members of the drive pulley is provided with an inclined surface guiding the belt wound around the pulley main body in a width direction thereof at a time of being in contact with a side edge of the belt, and a convex portion protruding in an axial direction of the rotary shaft and brought into contact with the inner ring of the rolling bearing, and is formed such that one side half portion facing to the pulley main body and the other side half portion facing to the rolling bearing have the same shape, and a receiving portion receiving a convex portion protruding to the pulley main body side of each of the regulating members is formed in both end portions in an axial direction of the pulley main body.

In accordance with one or more embodiments of the present invention, since the half portion shape in the pulley main body side of each of the regulating members and the half portion shape in the rolling bearing side have the same shape, the inclined surface and the convex portion are formed in both of the side facing to the pulley main body and the side facing to the rolling bearing. Accordingly, even if each of the regulating members is attached to the portion between the pulley main body and the rolling bearing in any direction, any one inclined surface is positioned in the pulley main body side, and any one convex portion is brought into contact with the inner ring of the rolling bearing. Accordingly, an erroneous assembly that each of the regulating members is assembled in the pulley main body in an erroneous direction is not generated. Further, since the convex portion is brought into contact with the inner ring of the rolling bearing, it is possible to pinch each of the regulating members between the inner ring of the rolling bearing and the end portion of the pulley main body without obstructing the rotation of the drive pulley so as to firmly maintain the attaching state of each of the regulating members to the pulley main body. Further, since the convex portion protruding to the pulley main body side is received in the receiving portion, it is possible to securely make the pulley main body and each of the regulating members be in close contact with each other.

As mentioned above, in accordance with the present invention, not only it is possible to easily process the tooth portion in the drive pulley by structuring the drive pulley by the pulley main body and each of the regulating members, but also it is possible to prevent each of the regulating members from being erroneously assembled in the pulley main body, so that it is possible to provide the motor-driven steering apparatus provided with the compact drive pulley in which the pulley main body and each of the regulating members are attached in the firm state.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven steering apparatus applying an assist torque by an electronic motor to a steering torque from a steering wheel comprising:
   a steering member reciprocating in a longitudinal direction in correspondence to a rotation of a steering wheel;
   a ball nut inserted to a ball thread shaft formed in the steering member via a plurality of balls;
   a rotary pulley provided in a rotary shaft of the electric motor;
   a driven pulley coupled to the rotary pulley via a belt and integrally rotating with the ball nut; and
   the drive pulley being rotatably supported in both sides in an axial direction by a rolling bearing.
   wherein the drive pulley comprises a pulley main body provided with a plurality of tooth portions with a predetermined interval in a peripheral direction, and a pair of regulating members attached to both end sides in an axial direction of the pulley main body and regulating a movement in a width direction of a belt wound around the pulley main body, and
   each of the regulating members is pinched between an inner ring of the rolling bearing and an end portion of the pulley main body, and
   each of the regulating members of the drive pulley is provided with an inclined surface guiding the belt wound around the pulley main body in a width direction thereof at a time of being in contact with a side edge of the belt, and
   a convex portion, protruding in an axial direction of the rotary shaft and brought into contact with the inner ring of the rolling bearing, is formed such that one side half portion facing to the pulley main body and the other side half portion facing to the rolling bearing have a same shape, and
   a receiving portion receiving a convex portion protruding to the pulley main body side of each of the regulating members is formed in both end portions in an axial direction of the pulley main body.

2. A motor-driven steering apparatus as claimed in claim 1, wherein each of the regulating members of the drive pulley is formed such that one side half portion facing to the pulley main body and the other side half portion facing to the rolling bearing have a same shape.

3. A motor-driven steering apparatus as claimed in claim 2, wherein the rotary shaft and the pulley main body are integrally formed.

4. A motor-driven steering apparatus as claimed in claim 1, wherein the rotary shaft and the pulley main body are integrally formed.

5. A motor-driven steering apparatus as claimed in claim 1, wherein the inclined surface of each of the regulating members protrudes in a collar shape in an outer peripheral direction of the pulley main body.

6. A motor-driven steering apparatus applying an assist torque by an electronic motor to a steering torque from a steering wheel comprising:
   a steering member reciprocating in a longitudinal direction in correspondence to a rotation of a steering wheel;
   a ball nut inserted to a ball thread shaft formed in the steering member via a plurality of balls;
   a drive pulley provided in a drive shaft of the electric motor;
   a driven pulley coupled to the drive pulley via a belt and integrally rotating with the ball nut; and
   the drive pulley being rotatably supported in both sides in an axial direction by a pair of rolling bearing,
   wherein the drive pulley comprises a pulley main body provided with a plurality of tooth portions with a predetermined interval in a peripheral direction, and a pair of regulating members attached to both end sides in an axial direction of the pulley main body and regulating a movement in a width direction of a belt wound around the pulley main body, and
   each of the regulating members is pinched between an inner ring of the rolling bearing and an end portion of the pulley main body, and
   each of the regulating members of the drive pulley is provided with an inclined surface guiding the belt wound around the pulley main body in a width direction thereof at a time of being in contact with a side edge of the belt, and
   a convex portion, protruding in an axial direction of the rotary shaft and brought into contact with the inner ring of the rolling bearing, is formed such that one side half portion facing to the pulley main body and the other side half portion facing to the rolling bearing have a same shape, and
   a receiving portion receiving a convex portion protruding to the pulley main body side of each of the regulating members is formed in both end portions in an axial direction of the pulley main body.

7. A motor-driven steering apparatus applying an assist torque by an electronic motor to a steering torque from a steering wheel comprising:
   a steering member reciprocating in a longitudinal direction in correspondence to a rotation of a steering wheel;
   a ball nut inserted to a ball thread shaft formed in the steering member via a plurality of balls;
   a drive pulley provided in a drive shaft of the electric motor;
   a driven pulley coupled to the drive pulley via a belt and integrally rotating with the ball nut; and
   the drive pulley being rotatably supported in both sides in an axial direction by a pair of rolling bearing,
   wherein the drive pulley comprises a pulley main body provided with a plurality of tooth portions with a predetermined interval in a peripheral direction, and a pair of regulating members attached to both end sides in an axial direction of the pulley main body and regulating a movement in a width direction of a belt wound around the pulley main body, and each of the regulating members is pinched between a plurality of inner rings of the rolling bearing and an end portion of the pulley main body, and each of the regulating members of the drive pulley is provided with an inclined surface guiding the belt wound around the pulley main body in a width direction thereof at a time of being in contact with a side edge of the belt, and a convex portion, protruding in an axial direction of the rotary shaft and brought into contact with the inner ring of the rolling bearing, is formed such that one side half portion facing to the pulley main body and the other side half portion facing to the rolling bearing have a same shape, and a receiving portion receiving a convex portion protruding to the pulley main body side of each of the regulating members is formed in both end portions in an axial direction of the pulley main body.

* * * * *